Sept. 23, 1958
W. P. KIMSEY ET AL
2,852,870
TWO SPEED SCRAPER APRON
Filed May 4, 1955
2 Sheets-Sheet 1
Fig-1-
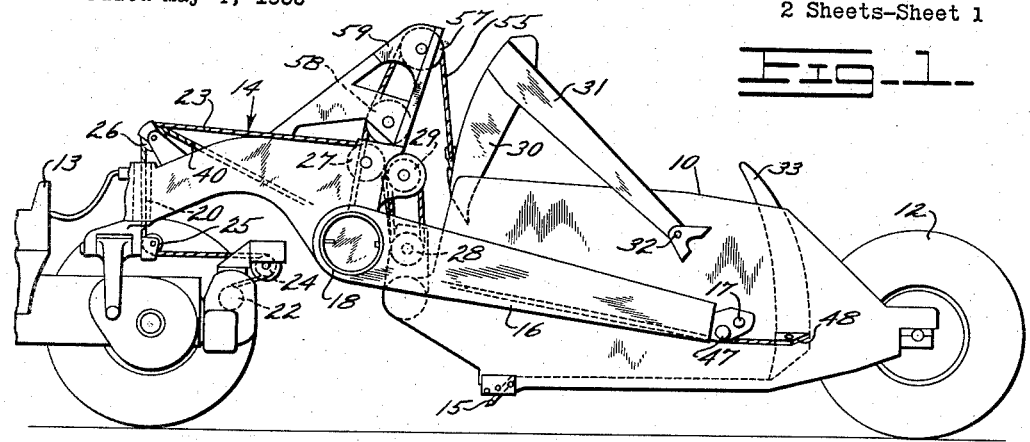
Fig-2-
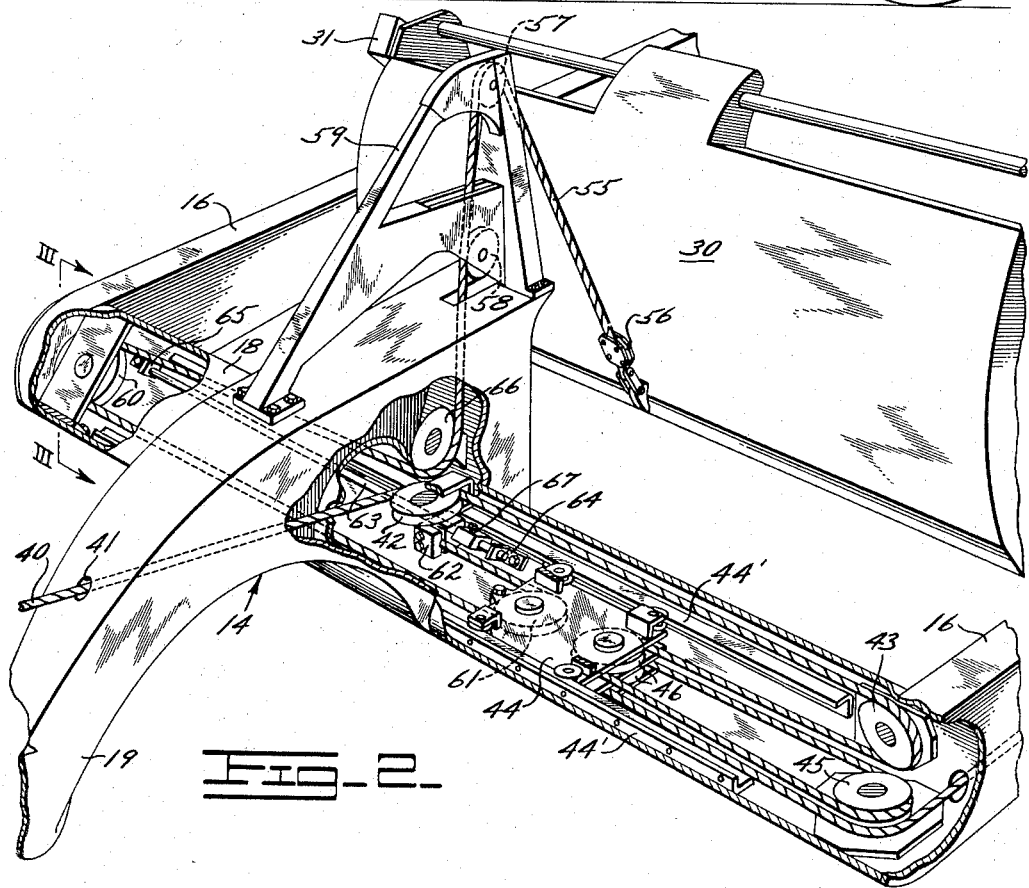
INVENTORS
WOODROW P. KIMSEY
WILLIAM L. HOLMSTROM
BY
Fryer and Johnson
ATTORNEYS Sept. 23, 1958 W. P. KIMSEY ET AL 2,852,870
TWO SPEED SCRAPER APRON
Filed May 4, 1955 2 Sheets-Sheet 2
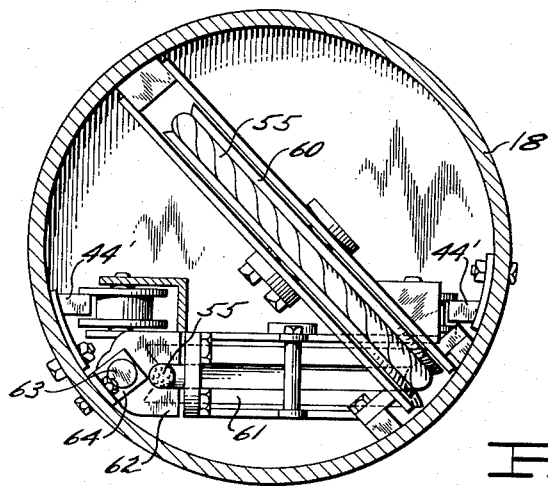
Fig_3_
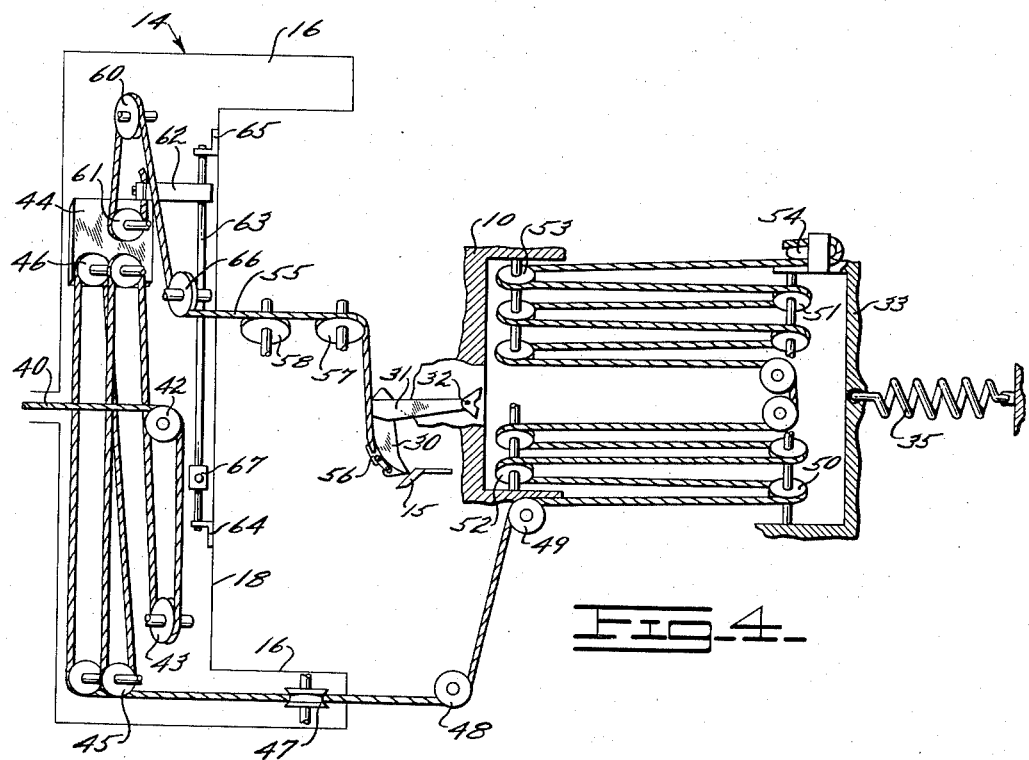
Fig_4_
INVENTORS
WOODROW P. KIMSEY
WILLIAM L. HOLMSTROM
BY
Fryer and Johnson
ATTORNEYS

United States Patent Office 2,852,870
Patented Sept. 23, 1958

2,852,870

TWO SPEED SCRAPER APRON

Woodrow P. Kimsey, Lockport, and William L. Holmstrom, Joliet, Ill., assignors to Caterpillar Tractor Co., Peoria, Ill., a corporation of California Application May 4, 1955, Serial No. 506,052

9 Claims. (Cl. 37—126)

The present invention relates to control mechanisms for scrapers or earthmoving equipment and particularly to the mechanism for correlating the control of the ejector and apron of earthmoving scrapers.

One type of scraper commonly employed for collecting and moving large quantities of earth and the like comprises a large bowl or body member with a draft connection by means of which it can be connected to and drawn by a tractor unit. The bowl is provided with a scraper edge adjacent its forward position and may be lowered to bring the scraping edge into contact with the ground to effect collection of earth which is deposited in the bowl.

The front of the bowl which is normally open for the collection of earth is provided with a gate-like device usually referred to as an apron which can be swung downwardly or closed during transportation of a load. During the scraping or loading operation the apron is partially closed to control the filling of the bowl with earth in a manner well-known to those familiar with this art. Accurate control of the apron when only partially opened is therefore essential. The rear wall of the bowl is formed as an ejector which is movable forwardly to empty the bowl of its contents when it has been drawn to a proper place for discharge of the earth that has been collected.

The operations of raising and lowering the bowl and its scraping edge with relation to the ground are controlled by the operator of the tractor, and control means are conveniently provided for this purpose including a cable wound on a drum carried by the tractor and adapted to be rotated by a suitable power take-off shaft so that the cable may be taken in or paid out as required.

Similarly, the operations of the ejector and of the apron are controlled by a single cable wound on a second drum carried by the tractor and rotated by a suitable power take-off shaft, the sequence of operation being that, as the cable is taken in, the ejector does not start its forward movement until the apron is fully opened. Since accurate control of the apron is essential during loading operations when the apron is only partially opened, as previously described, slow speed apron travel is desirable during loading operation. If this slow speed is maintained throughout the entire arc of apron movement, the overall cycle time for loading earth, transporting it to the desired location, depositing the earth and returning to the loading site is unduly increased.

It is the object of the present invention to provide a control mechanism for a scraper having an ejector and an apron actuated by a single control cable wherein the rate of travel of the apron is automatically increased during the latter portion of the opening cycle.

It is a further object of the invention to provide means whereby the point at which increased apron speed becomes effective can be easily adjusted for maximum efficiency over a wide range of operating conditions.

Still further objects and advantages are made apparent in the following specification.

In the drawings:

Fig. 1 is a view in side elevation of a scraper embodying the present invention and illustrated as being drawn by a tractor;

Fig. 2 is a fragmentary view in perspective of the scraper draft member and apron, with parts broken away to show the arrangement of the cables and sheaves employed in the present invention;

Fig. 3 is an enlarged fragmentary view taken on line III—III of Fig. 2; and

Fig. 4 is a diagrammatic view illustrating the operation of control cables for the ejector and apron of the scraper.

In Fig. 1 of the drawings a scraper of the type with which the present invention may be employed is illustrated as comprising a main bowl or body portion 10 supported adjacent its rear end by a pair of ground engaging wheels 12 and supported at its forward end on a tractor 13 by a draft connection generally indicated at 14. The scraper bowl is provided with a blade 15 adjacent its forward portion to effect collection of earth as will be presently explained. The draft connection 14 includes a pair of spaced hollow arms 16 pivotally connected to each side of the bowl 10 as by pins 17. At their forward ends, arms 16 are connected as by welding to a cross member 18 which is of hollow tubular construction. A draft arm 19 extends forwardly from the cross member 18 and is adapted to be connected at its forward end with a suitable universal pivotal connection 20 carried on the rear end of tractor 13. The tractor also carries a cable control unit of conventional construction which takes power from a rear power take-off shaft of the tractor and includes a pair of cable-winding drums one of which is indicated in dotted lines at 22, the function of drums 22 being to take in or pay out cables which control the operation of the scraper. In the present case, scraper bowl 10 is adapted to be raised or lowered about the axis of its supporting wheels 12 to control the position of blade 15 with respect to the ground. This raising and lowering of the scraper is accomplished by a cable 23, secured to and wound about one of the drums 22. The cable 23 leads from its drum 22 over a cable laying sheave 24, then around a guide sheave 25 and upwardly through the hollow center of a part of the universal connection 20 and over a guide sheave 26 disposed above such connection. From the guide sheave 26, the cable 23 leads rearwardly and passes over a guide sheave 27 on the draft connection and is then led around two groups of sheaves, one indicated at 28, being carried by the forward end of the scraper bowl, and the other indicated at 29, being carried by the draft connection, and is finally secured at its end to the draft connection adjacent the sheaves 29. Thus the forward end of the bowl can be raised or lowered upon taking in or paying out of cable 23 and as the bowl raises or lowers, it will pivot about the axis of its supporting wheels 12. During raising and lowering of the bowl, pivotal movement will also take place about the pins 17 of arms 16 and at the universal draft connection 20.

When loading the bowl, it is lowered until its scraping blade engages the ground and, as the tractor draws the scraper forwardly, the earth engaged by the scraping blade will be deposited in the bowl in the usual manner. When the bowl is filled, it may be raised by taking in cable 23 and the scraper will serve as a tractor drawn unit conveying or transporting the earth to the desired point of discharge.

The bowl is provided with a front gate or apron 30, which may be closed to prevent the earth from spilling from the bowl as it is being transported and which also serves the purpose, when partially closed, of regulating the amount of earth that can pass into the bowl over the scraping edge during loading operations. Apron 30 is carried by a pair of arms 31 pivoted as at 32 to the side of the bowl so that it may be swung upwardly to its open position as illustrated in Fig. 1.

The rear wall of the scraper bowl is indicated at 33 and is supported to move forwardly with relation to the bottom and sides of the bowl to serve as an ejector for the purpose of discharging the contents of the bowl forwardly over the edge of blade 15 when the apron is in its raised position. The ejector is supported, by means not shown, for reciprocating motion with respect to the scraper and is normally urged in a rearward direction as by spring means schematically shown at 35 in Fig. 4.

In the present invention, the apron 30 employed for closing the front end of the scraper bowl, and the ejector 33 which forms the back of the bowl and moves forwardly to discharge its contents are controlled by a single cable 40. One end of cable 40 is secured to the other of drums 22 of the tractor and leads over guide sheaves 25 and 26 similar to the manner of cable 23, and enters tubular cross member 18 through a tube 41 which extends through the draft connection 14. As is best shown in Figs. 2 and 4 the cable 40 passes over a guide sheave 42, within the tubular cross member, then over a guide sheave 43 after which it is trained over the sheaves 46 in a movable or sliding block 44 and the sheaves 45 on a stationary block. Sliding block 44 is supported on spaced guides 44' inside cross member 18, so that as cable 40 is taken in, it tends to advance the block 44 toward the sheave 45 with a mechanical advantage determined by the number of strands disposed between the two blocks. After passing through the sheaves 45 and 46 on the blocks, the cable 40 is carried downwardly through one of the side arms 16 of the draft assembly and passes outwardly through the rear end of the arm over a guide sheave 47, and thence over a guide sheave 48 and then inwardly of the bowl and over a sheave 49 (Fig. 4). From the sheave 49, the cable is led around a series of sheaves carried on blocks 50 and 51 which are secured to the ejector and blocks 52 and 53 carried by the bowl and the end of the cable is made fast, as indicated at 54, to an anchor on the ejector.

The apron 30 is raised by a pull on cable 55 which, as best shown in Fig. 2, is secured to the apron by an anchor 56. From anchor 56 cable 55 leads over guide sheaves 57 and 58 carried by a sheave tower 59 on draft member 14, thence over a guide sheave 66 supported on the draft member and then into cross member 18 wherein cable 55 is led over a guide sheave 60 and a sheave 61 carried in block 44 and is made fast to a slide member 62 slidably mounted on a rod 63 supported between spaced brackets 64 and 65 secured to the inside of the cross member.

In operation taking in on cable 40 first raises the apron 30 and thereafter advances the ejector 33. This sequence of operation results from the fact that the first taking in movement of cable 40 draws the block 44 toward the block sheaves 45 and exerts a pull on the apron raising cable 55. When the apron is fully raised the block 44 abuts the block of sheaves 45 so that further movement of cable 40 acts to advance the ejector in the manner described. The fact that the resistance to movement of the apron is less than that of the ejector also contributes to this sequence of operation. Furthermore, since the ejector is retracted by spring action or by other forcing means when the cable is payed out it will attain its fully retracted position before the apron starts to close.

When loading earth into the bowl with the apron partially closed for regulating the amount of earth that can pass into the bowl, accurate control of the apron and, hence, slow speed reeling in of the cable 55 is desirable. On the other hand, the full opening movement of the apron prior to ejecting a load of earth from the bowl should be rapid in the interest of saving time in the discharging operation. Such two speed operation of the apron is accomplished by means which include the slide member 62 on the rod 63 and a stop member 67 adjustably fixed to the rod 63. When the take in of cable 40 is initiated the parts assume positions somewhat as illustrated in Fig. 4 with the slide 62 abutting the block 44. As the block 44 approaches the sheaves 45, the slide 62 follows it and the apron is raised slowly by the cable 55 which has only one part effective between sheaves 60 and 61. When the apron has been raised through what might be termed the loading range of its movement the slide 62 abuts the stop 67 as shown in Fig. 2. This prevents the slide from following the block 44 so that its sheave 61 acts upon a two part line in raising the apron thus doubling the speed of its opening movement.

The apron control ararngement just described not only provides the desirable slow speed control in the arc of apron movement normally employed during loading, but also provides means for automatically speeding up apron movement in its arc of travel where accuracy of control is unimportant and speed of opening is the primary concern. Furthermore, the point at which the increased apron speed becomes effective can be varied by adjusting the position of stop 67 on rod 63 to obtain the most efficient apron opening speed pattern for a particular soil condition on a particular earthmoving project.

We claim:

1. In an earthmoving scraper or the like which includes an earth receiving bowl and an apron closing the forward side of said bowl, means to raise the apron a short distance to admit earth to the bowl and a greater distance to permit ejection of the contents of the bowl, and adjustable stop means operable automatically after the apron is raised a predetermined short distance to increase abruptly the speed at which it rises.

2. In a cable control for raising the apron which closes the forward end of an earth moving scraper bowl and which includes a system of sheaves over which the cable is trained, means comprising a movable sheave block in combination with an adjustable stop mechanism for changing the effective position of one of said sheaves during the raising operation whereby the speed of raising will be increased from a low speed in the loading position of the apron to a high speed during its movement toward full open position.

3. In a scraper or the like which comprises a bowl for the reception of earth, a movable apron for closing one end of the bowl, an ejector adapted to be advanced through the bowl toward said end, a first cable adapted to be manipulated to control both the apron and ejector, means whereby a pulling force applied to said first cable will first move the apron to its full open position and will thereafter advance the ejector through the bowl, a sheave associated wtih said first cable and carried by a movable block, a second cable passing over a second sheave carried by said movable block and made fast at one end thereof to the apron, a movable anchor normally maintained in abutment with said movable block and secured to the other end of such second cable, and a stop carried by the scraper and engageable by the movable anchor to automatically increase the rate of movement of the apron.

4. In a scraper or the like which comprises a bowl for the reception of earth, a movable apron for closing one end of the bowl, an ejector adapted to be advanced through the bowl toward said end, a first cable adapted to be manipulated to control both the apron and ejector, means whereby a pulling force applied to said first cable will first move the apron to its full open position and will thereafter advance the ejector through the bowl, a sheave associated with said first cable and carried by a movable block, a second cable passing over a second sheave carried by said movable block and made fast at one end thereof to the apron, a movable anchor normally maintained in abutment with said movable block and secured to the other end of such second cable, and a stop to limit the travel of said movable anchor, said second cable forming a two part line when the movable anchor and stop are in abutment.

5. In a scraper or the like which comprises a bowl for the reception of earth, a movable apron for closing one end of the bowl, an ejector adapted to be advanced through the bowl toward said end, a first cable adapted to be manipulated to control both the apron and ejector, means whereby a pulling force applied to said first cable will first move the apron to its full open position and will thereafter advance the ejector through the bowl, a sheave associated wtih said first cable and carried by a movable block, a second cable passing over a second sheave carried by said movable block and made fast at one end thereof to the apron, a movable anchor normally maintained in abutment with said movable block and secured to the other end of such second cable, and an adjustable stop carried by the scraper and engageable by the movable anchor to automatically increase the rate of apron movement when said stop and sliding anchor are in abutment.

6. In a scraper or the like which comprises a bowl for the reception of earth, an apron mechanism, an ejector mechanism, a draft connection for securing the scraper to a tractor and including a hollow member extending transversely of the scraper, a traveling block within said hollow member and adapted to support a plurality of sheaves, a first cable adapted to be passed over at least one of said sheaves and made fast at one end thereof to a driven cable drum on the tractor and at its other end to the ejector for manipulation of said ejector, a second cable adapted to be passed over at least one of said sheaves and made fast at one end thereof to the apron, an anchor adapted for sliding reciprocal movement within said hollow member and secured to the other end of such second cable, and means for restricting movement of said anchor at a preselected point of travel through the hollow member to increase the rate of movement of the apron.

7. In a scraper or the like which comprises a bowl for the reception of earth, an apron mechanism, an ejector mechanism, a draft connection for securing the scraper to a tractor and including a hollow member extending transversely of the scraper, a traveling block within said hollow member and adapted to support a plurality of sheaves, a first cable adapted to be passed over at least one of said sheaves and made fast at one end thereto a driven cable drum on the tractor and at its other end to the ejector for manipulation of said ejector, a second cable adapted to be passed over at least one of said sheaves and made fast at one end thereof to the apron, an anchor adapted for sliding reciprocal movement within said hollow member and secured to the other end of said second cable, and an adjustable stop carried by said hollow member and engageable by the anchor for automatically increasing the rate of movement of the apron when said anchor and stop are in abutment.

8. In a scraper or the like which comprises a bowl for the reception of earth, an apron mechanism, an ejector mechanism, a draft connection for securing the scraper to a tractor and including a hollow member extending transversely of the scraper, a traveling block within said hollow member and adapted to support a plurality of sheaves, a first cable adapted to be passed over at least one of said sheaves and made fast at one end thereof to a driven cable drum on the tractor and at its other end to the ejector for manipulation of said ejector, a second cable adapted to be passed over at least one of said sheaves and made fast at one end thereof to the apron, an anchor adapted for sliding reciprocal movement within said hollow member and secured to the other end of such second cable, and normally in abutment with said traveling block, and a stop carried by said hollow member for restricting movement of said anchor at a preselected point of travel through the hollow member to increase the rate of movement of the apron.

9. In combination with a driven drum, a first part to be controlled and a second part to be controlled, spaced sheaves supported for rotation in a block adapted for reciprocal movement in a guide, a first cable passed over one of said spaced sheaves and made fast at one end thereof to the driven drum and at its other end to the first part to be controlled, a second cable passed over the other of said sheaves and made fast at one end thereof to the second part to be controlled, an anchor supported for reciprocal movement with respect to the guide and secured to the other end of such second cable, and means for automatically increasing the rate of movement of the second part to be controlled during a portion of its movement as said first cable is reeled in on the driven drum, said means including an adjustable stop carried by the guide and engageable by said anchor.

References Cited in the file of this patent

UNITED STATES PATENTS

| | | |
|---|---|---|
| 2,477,811 | Le Tourneau | Aug. 2, 1949 |
| 2,508,421 | Reischl | May 23, 1950 |